United States Patent [19]
Moore et al.

[11] Patent Number: 6,020,875
[45] Date of Patent: Feb. 1, 2000

[54] HIGH FIDELITY MECHANICAL TRANSMISSION SYSTEM AND INTERFACE DEVICE

[75] Inventors: David F. Moore, Redwood City; Kenneth M. Martin, Palo Alto; Louis B. Rosenberg, Pleasanton; Bruce M. Schena, Menlo Park, all of Calif.

[73] Assignee: Immersion Corporation, San Jose, Calif.

[21] Appl. No.: 08/961,790

[22] Filed: Oct. 31, 1997

[51] Int. Cl.$^7$ .................................................. G09G 3/02
[52] U.S. Cl. ........................... 345/156; 345/157; 463/37; 463/38
[58] Field of Search ................................... 345/156, 157; 463/37, 38; 434/45, 61, 62; 248/278.1; 318/160; 73/862.043; 395/500

[56] References Cited

U.S. PATENT DOCUMENTS

| | | | |
|---|---|---|---|
| 3,490,059 | 1/1970 | Paulsen et al. | 73/133 |
| 3,795,150 | 3/1974 | Eckhardt | 74/5.4 |
| 3,875,488 | 4/1975 | Crocker et al. | 318/648 |
| 3,903,614 | 9/1975 | Diamond et al. | 35/12 S |
| 3,919,691 | 11/1975 | Noll | 340/172.5 |
| 4,148,014 | 4/1979 | Burson | 340/709 |
| 4,174,833 | 11/1979 | Hennig et al. | 273/1 E |
| 4,398,889 | 8/1983 | Lam et al. | 434/45 |
| 4,436,188 | 3/1984 | Jones | 188/378 |
| 4,477,043 | 10/1984 | Repperger | 244/223 |
| 4,489,304 | 12/1984 | Hayes | 338/128 |
| 4,632,341 | 12/1986 | Repperger et al. | 244/230 |
| 4,677,355 | 6/1987 | Baumann | 318/160 |
| 4,724,715 | 2/1988 | Culver | 74/471 R |
| 4,775,289 | 10/1988 | Kazerooni | 414/735 |
| 4,795,296 | 1/1989 | Jau | 414/5 |
| 4,800,721 | 1/1989 | Cemenska et al. | 60/393 |
| 4,803,413 | 2/1989 | Kendig et al. | 318/648 |
| 4,811,608 | 3/1989 | Hilton | 73/862.04 |
| 4,823,634 | 4/1989 | Culver | 74/471 XY |
| 4,857,881 | 8/1989 | Hayes | 338/128 |
| 4,861,269 | 8/1989 | Meenan, Jr. | 434/45 |

(List continued on next page.)

FOREIGN PATENT DOCUMENTS

| | | |
|---|---|---|
| 0085518 | 1/1983 | European Pat. Off. . |
| 0 085 518 | 8/1983 | European Pat. Off. . |
| 0 111 992 | 6/1984 | European Pat. Off. . |
| WO9532459 | 11/1995 | WIPO . |

OTHER PUBLICATIONS

Douglas A. McAffee et al., "Teleoperator Subsystem/Telerobot Demonstrator: Force Reflecting Hand Controller Equipment Manual," Jet Propulsion Laboratory—California Institute of Technology, 1988, pp. 1–11.

Massimo Andrea Russo, "The Design and Implementation of a three Degree–of–Freedom Force Output Joystick," May 11, 1990, Dept. of Mech. Engineering, 1990.

(List continued on next page.)

*Primary Examiner*—Matthew Luu
*Assistant Examiner*—Jeff Piziali
*Attorney, Agent, or Firm*—James R. Riegel

[57] ABSTRACT

A high-fidelity mechanical transmission system for transmitting forces which can be used in a human-computer force feedback interface device connected to a host computer. The transmission system includes multiple stages, including an actuator stage coupled to an actuator and one or more additional stages. The actuator stage includes a rotatable capstan pulley coupled to the actuator, a cylindrical capstan drum, and a flexible member, such as a cable, coupling the capstan pulley and drum. The cable is coupled to the capstan drum at both ends, and causes the capstan drum to rotate for multiple revolutions. The output stage is coupled to the driven object to rotate the driven object. The output stage can include a capstan pulley, capstan drum, and cable. An interface device can include the transmission system for inputting motion signals to a connected host computer and for providing force feedback to the user. The interface device includes a user manipulatable object, such a steering wheel, joystick, or the like, which is manipulated by the user to interact with the host computer.

48 Claims, 6 Drawing Sheets

U.S. PATENT DOCUMENTS

| | | | |
|---|---|---|---|
| 4,868,549 | 9/1989 | Affinito et al. | 340/710 |
| 4,961,038 | 10/1990 | MacMinn | 318/696 |
| 4,983,901 | 1/1991 | Lehmer | 318/685 |
| 5,007,300 | 4/1991 | Siva | 74/471 XY |
| 5,044,956 | 9/1991 | Behensky et al. | 434/45 |
| 5,056,787 | 10/1991 | Mitsuyoshi | 273/148 B |
| 5,103,404 | 4/1992 | McIntosh | 318/568.22 |
| 5,107,080 | 4/1992 | Rosen | 200/6 A |
| 5,116,051 | 5/1992 | Moncrief et al. | 273/448 B |
| 5,116,180 | 5/1992 | Fung et al. | 414/5 |
| 5,142,931 | 9/1992 | Menahem | 74/471 XY |
| 5,143,505 | 9/1992 | Burdea et al. | 414/5 |
| 5,146,566 | 9/1992 | Hollis, Jr. et al. | 395/275 |
| 5,156,363 | 10/1992 | Cizewski et al. | 244/223 |
| 5,182,557 | 1/1993 | Lang | 341/20 |
| 5,184,319 | 2/1993 | Kramer | 364/806 |
| 5,185,561 | 2/1993 | Good et al. | 318/432 |
| 5,189,355 | 2/1993 | Larkins et al. | 318/685 |
| 5,193,963 | 3/1993 | McAffee et al. | 415/5 |
| 5,220,260 | 6/1993 | Schuler | 318/561 |
| 5,223,776 | 6/1993 | Radke et al. | 318/568 |
| 5,228,356 | 7/1993 | Chuang | 74/471 |
| 5,235,868 | 8/1993 | Culver | 74/471 XY |
| 5,264,768 | 11/1993 | Gregory et al. | 318/561 |
| 5,275,565 | 1/1994 | Moncrief | 434/29 |
| 5,286,203 | 2/1994 | Fuller et al. | 434/45 |
| 5,296,846 | 3/1994 | Ledley | 345/161 |
| 5,317,336 | 5/1994 | Hall | 345/164 |
| 5,327,790 | 7/1994 | Levin et al. | 73/862.325 |
| 5,379,663 | 1/1995 | Hara | 74/471 XY |
| 5,389,865 | 2/1995 | Jacobus et al. | 318/568.11 |
| 5,396,266 | 3/1995 | Brimhall | 345/161 |
| 5,399,091 | 3/1995 | Mitsumoto | 434/61 |
| 5,405,152 | 4/1995 | Katanics et al. | 273/438 |
| 5,414,337 | 5/1995 | Schuler | 318/561 |
| 5,436,638 | 7/1995 | Bolas et al. | 345/156 |
| 5,436,640 | 7/1995 | Reeves | 345/161 |
| 5,451,924 | 9/1995 | Massimino et al. | 340/407.1 |
| 5,452,615 | 9/1995 | Hilton | 73/862.043 |
| 5,473,235 | 12/1995 | Lance et al. | 318/561 |
| 5,482,051 | 1/1996 | Reddy et al. | 128/733 |
| 5,512,919 | 4/1996 | Araki | 345/156 |
| 5,513,100 | 4/1996 | Parker et al. | 364/167.01 |
| 5,530,455 | 6/1996 | Gillick et al. | 345/163 |
| 5,547,383 | 8/1996 | Yamaguchi | 434/62 |
| 5,576,727 | 11/1996 | Rosenberg et al. | 345/179 |
| 5,577,981 | 11/1996 | Jarvik | 482/4 |
| 5,587,937 | 12/1996 | Massie et al. | 364/578 |
| 5,589,828 | 12/1996 | Armstrong | 341/20 |
| 5,589,854 | 12/1996 | Tsai | 345/161 |
| 5,591,082 | 1/1997 | Jensen et al. | 463/38 |
| 5,611,731 | 3/1997 | Bouton et al. | 463/37 |
| 5,623,582 | 4/1997 | Rosenberg | 395/99 |
| 5,629,594 | 5/1997 | Jacobus et al. | 318/568.11 |
| 5,631,861 | 5/1997 | Kramer | 364/406 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,138 | 9/1997 | Culver | 345/161 |
| 5,691,898 | 11/1997 | Rosenberg et al. | 364/190 |
| 5,694,153 | 12/1997 | Aoyagi et al. | 345/161 |
| 5,709,219 | 1/1998 | Chen et al. | 128/782 |
| 5,721,566 | 2/1998 | Rosenberg et al. | 345/161 |
| 5,724,068 | 3/1998 | Sanchaz et al. | 345/161 |
| 5,727,188 | 3/1998 | Hayes | 395/500 |
| 5,731,804 | 3/1998 | Rosenberg | 345/156 |
| 5,734,373 | 3/1998 | Rosenberg et al. | 345/161 |
| 5,742,278 | 4/1998 | Chen et al. | 345/156 |
| 5,754,023 | 5/1998 | Roston et al. | 318/561 |
| 5,755,577 | 5/1998 | Gillio | 434/262 |
| 5,767,839 | 6/1998 | Rosenberg | 345/161 |
| 5,769,640 | 6/1998 | Jacobus et al. | 434/262 |
| 5,779,209 | 7/1998 | Rello | 248/278.1 |
| 5,781,172 | 7/1998 | Engel et al. | 345/164 |
| 5,790,108 | 8/1998 | Salcudean et al. | 345/184 |
| 5,805,140 | 9/1998 | Rosenberg et al. | 345/161 |
| 5,821,920 | 10/1998 | Rosenberg et al. | 345/156 |
| 5,823,876 | 10/1998 | Unbehand | 463/37 |
| 5,825,308 | 10/1998 | Rosenberg | 341/20 |
| 5,828,197 | 10/1998 | Martin et al. | 318/567 |
| 5,829,745 | 11/1998 | Houle | 273/148 B |
| 5,844,392 | 12/1998 | Peurach et al. | 318/568.17 |
| 5,872,438 | 2/1999 | Roston | 318/568.11 |
| 5,889,670 | 3/1999 | Schuler et al. | 364/186 |

OTHER PUBLICATIONS

E. Snow et al., "Compact Force–Reflecting Hand Controller," NASA Tech Brief, vol. 15, No. 4, Item #153, 1991, pp. 1–15a.

J.N. Herndon, et al., "The State–of–the–Art Model M–2 Maintenance System," 1984, 1984 Topical Meeting on Robotics and Remote Handling in Hostile Environments, pp. 59–66.

Frederick P. Brooks, Jr. et al., "Project GROPE—Haptic Displays for Scientific Visualization," Computer Graphics, vol. 24 #4, Aug. 1990, pp. 177–185.

Louis Rosenberg, "A Force Feedback Programming Primer," Immersion Corporation, 1997, pp. 1–176.

Patrick Fischer et al., "Specification and Design of Input Devices for Teleoperation," IEEE CH2876–1, 1990, pp. 540–545.

J. Edward Colgate et al., "Implementation of Stiff Virtual Walls in Force–reflecting Interfaces," Dept. of Mechanical Engineering, Northwestern Univ., Evanston IL. 1993, pp. 1–7.

Antal K. Bejczy et al., "The Phantom Robot: Predictive Displays for Teleoperation with Time Display," IEEE CH2876–1, 1990, pp. 546–550.

Louis B. Rosenberg, "The Use of Virtual Fixtures as Perceptual Overlays to Enhance Operator Performance in Remote Environments" Crew Systems Directorate Biodynamics and Biocommunications Div., Wright–Patterson AFB OH 45433–7901, 1992, pp. 1–42.

Louis B. Rosenberg, "Virtual Fixtures as Tools to Enhance Operator Performance in Telepresence Environments," SPIE Telemanipulator Technology, 1993.

Louis B. Rosenberg, "Perceptual Design of a Virtual Rigid Surface Contact", Armstrong Laboratory, Crew Systems Directorate, Air Force Materiel Command, 1993, pp. 1–40.

Bernard D. Adelstein et al., "A High Performance Two Degree–of–freedom Kinesthetic Interface", MIT, Cambridge, MA, 1992, pp. 108–112.

Tan, H. et al., "Human factors for the design of force–reflecting haptic interfaces", Dept. Of Mech Engineering, MIT, 1994, pp. 1–11.

Tetsuo Kotoku, "A Predictive Display with Force Feedback and its Application to Remote Manipulation System with Transmission Time Delay", IEEE 0–7803–0737–2, 1992, pp. 239–246.

Louis B. Rosenberg et al., "The use of force feedback to enhance graphical user interfaces," Stereoscopic Displays and Virtual Reality Systems, Proc. SPIE 2653, 19, 1996, pp. 243–248.

Bernard D. Adelstein et al., "Design and Implementation of a Force Reflecting Manipulandum for Manual Control Research" NASA Ames Research/Dept. of Mechanical Engineering, MIT, 1992, pp. 1–24.

Pietro Buttolo et al., "Pen–based Force Display for Precision Manipulation in Virtual Environments", IEEE 0–8186–7084–3, 1995, pp. 217–224.

Brain Schmult et al., "Application Areas for Force–feedback Joystick", DSC–vol. 49, Advances in Robotics, Mechatronics, and Haptic Interfaces, 1993, pp. 47–54.

S.C. Jacobson et al., "High Performance, High Dexterity, Force Reflective Teleoperator II", ANS Topical Meeting on Robotics and Remote Systems, 1991, pp. 1–10.

Margaret Minsky, et al., "Feeling and Seeing: Issues in Force Display", Dept. of Computer Science, University of NC at Chapel Hill, ACM 1990 089791–351–5, pp. 235–242, 270.

Koichi Hirota et al., "Development of Surface Display", IEEE 0–7803–1363–1, 1993, pp. 256–262.

A.J. Kelley et al., "Magicmouse: Tactile and Kinesthetic feedback in the Human–compute Interface Using an Eletromagnetically Actuated Input/output Device", Dept. of Electrical Engineering, University of British Columbia, Vancouver, BC, 1993, pp. 1–27.

Hiroo Iwata, "Aritificial Reality with Force–feedback: Development of Desktop Virtual Space with Compact Master Manipulator", ACM 0–89791–344–2, 1990, pp. 165–170.

Vincent Hayward et al. "Design and Multi–Objective Optimization of a Linkage for a Haptic Interface," Advances in Robot Kinematics and Computationed Geometry, Kluwer Academic Publishers, 1994, pp. 359–368.

Kilpatrick, Paul Jerome, "The Use of Kinesthetic Supplement in an Interactive Graphics System", University of North Carolina at Chapel Hill, 1976, pp. 1–175.

Winey III, Calvin, "Computer Simulated Visual and Tactile Feedback as an Aid to Manipulator and Vehicle Control," Dept. of Mech. Engineering, MIT, 1981, pp. 1–79.

Hannaford, B. et al., "Performance Evaluation of a Six–Axis Generalized Force–Reflecting Teleoperator," IEEE Transactions on Systems, Man, and Cybernetics, vol. 21, No. 3, 1991, pp. 620–623, 631–633.

Atkinson, W. et al., "Computing with Feeling," Comput. & Graphics, vol. 2, 1977, pp. 97–103.

Millman, Paul et al., "Design of a Four Degree–of–Freedom Force–Reflecting Manipulandum with a Specified Force/Torque Workspace," Proc. of 1991 IEEE Int'l Conf. on Robotics and Automation, IEEE, 1991, pp. 1488–1493.

Howe, R. et al., "Task Performance with a Dextrous Tele-operated Hand System," Telemanipulator Technology '92, Proc. of SPIE, vol. 1833, 1992, pp. 1–9.

Batter, J. et al., "Grope–1: A Computer Display to the Sense of Feel," Proc. IFIP Congress 1971, pp. 759–763.

Ouh–young, M., "Force Display in Molecular Docking," Dept. of Computer Science, Univ. of N. Carolina at Chapel Hill, 1990, pp. 1–12, 66–85.

Ellis, R.E. et al., "Design and Evaluation of a High–Performance Prototype Planar Haptic Interface," DSC—vol. 49, Advances in Robotics, Mechatronics, and Haptic Interfaces, ASME 1993, pp. 55–64.

Rosenberg, L. et al., "Commercially Viable Force Feedback Controller for Individuals with Neuromotor Disabilities," Crew Systems Directorate, Wright–Patterson AFB, 1996, pp. 1–33.

Gotow, J.K. et al., "Perception of Mechanical Properties at the Man–Machine Interface," IEEE CH2503–1, 1987, pp. 688–689.

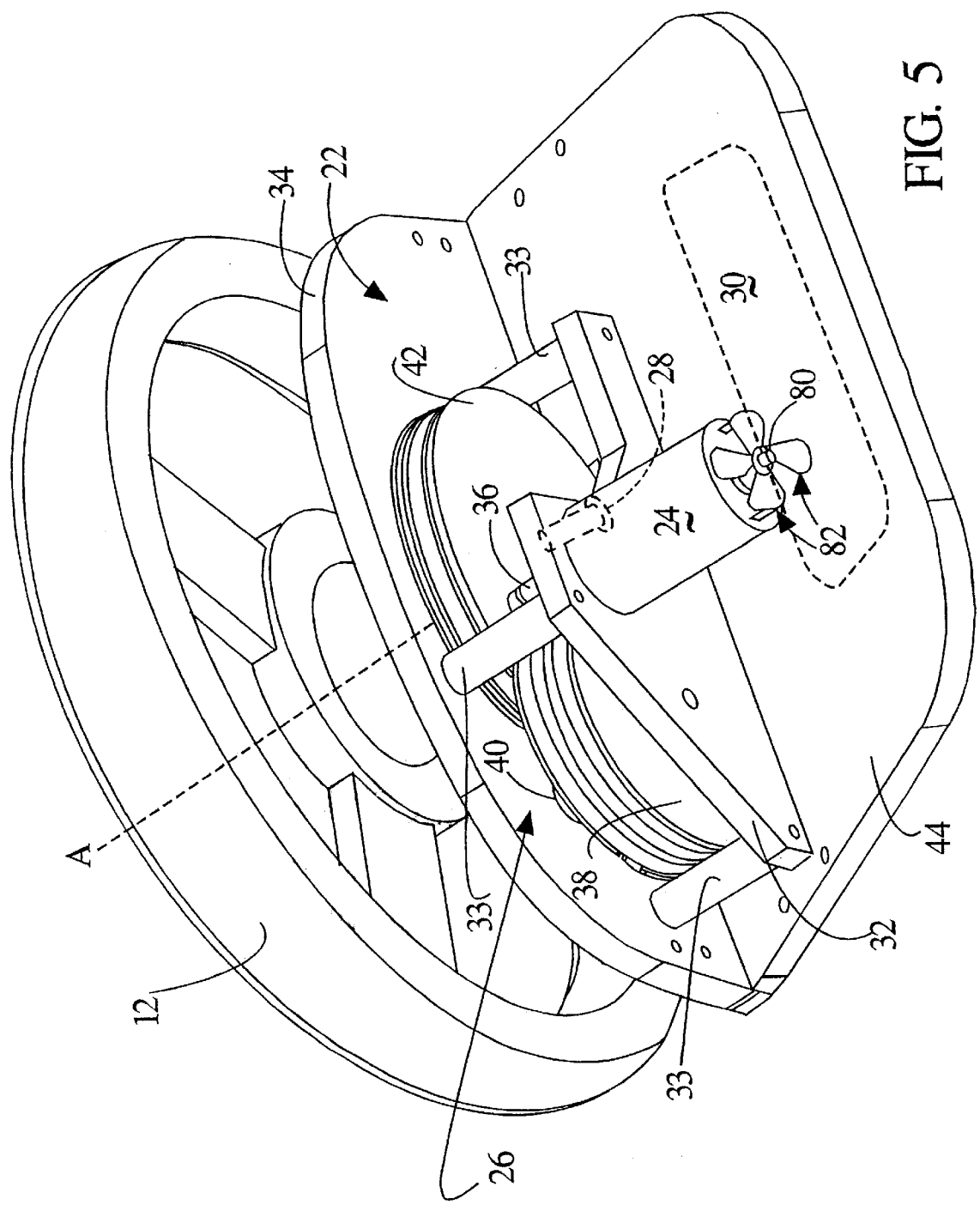

ary of the invention
HIGH FIDELITY MECHANICAL TRANSMISSION SYSTEM AND INTERFACE DEVICE

BACKGROUND OF THE INVENTION

The present invention relates generally to transmission systems for transmitting force and motion in a mechanical system, and more particularly to mechanical interface devices for allowing humans to interface with computer systems.

Mechanical transmission systems are used in a variety of applications for various purposes. One type of application that uses mechanical transmission systems is human/computer interface devices. Such devices allow a user to input commands or other data to a computer system and thereby interact with an application program executing on the computer. One type of application program provides graphical environments with which users interact to perform a variety of interfacing activities, such as games or graphical simulations. In many types of games, a graphical environment is displayed on a display screen of the computer including one or more graphical representations of objects such as vehicles. For example, one popular type of game is a vehicle simulation game, where the player controls a vehicle such as an automobile, military tank, aircraft, space ship, etc. through a virtual environment. The graphical environment includes other objects and features with which the player's vehicle may interact, such as other vehicles, a side railing on a race track, a missile or other projectile, etc. Simulations are similar to such games except that the realism of the graphical environment and the interaction with such are typically more stressed since the simulation is used for training or learning purposes rather than entertainment. The interface device allows the user to control his or her vehicle in the environment, usually through physical motion in degrees of freedom provided by the interface device.

One popular interface device for use with vehicle simulations and games is a steering wheel controller. The controller simulates the steering wheel in an automobile or other vehicle and typically includes a wheel rotably coupled to a base support to provide a single rotary degree of freedom. As the player turns the wheel, a sensor relays a signal to a connected host computer which controls the display of the simulated vehicle under control and updates the graphical environment accordingly. In addition, other controls may also be provided such as buttons, dials, levers, etc. similar to such controls in a real vehicle in response to which the host computer similarly updates the graphical environment. The steering wheel controller includes sensors and in some cases a mechanical transmission system to convert the physical motion of the wheel rotation into electrical signals that indicate the position of the wheel to the host computer.

Force feedback steering wheel controllers and other interface devices are also known in the prior art. Force feedback provides the user with sensory "haptic" (feel) information about an simulated environment. Thus these devices typically include more elaborate mechanical transmission systems to convey the forces from actuators to the interface object manipulated by the user. For example, recently-available force feedback steering wheels for the home consumer market provide forces to the steering wheel and user by providing a motor coupled to the rotary shaft of the steering wheel. The host computer or other electronic controller can output control signals at appropriate times to provide forces on the steering wheel in conjunction with events in the graphical environment. For example, when the user's vehicle moves off the road onto a rough shoulder, forces can be output on the steering wheel to cause the wheel to jerk in random directions to simulate a bumpy feel and jolts caused by the rough surface. A collision into a railing on the road can cause a large jolt force on the steering wheel in a direction opposite to the direction of travel into the railing.

Force feedback interface devices, and other types of devices, typically use high fidelity mechanical transmission systems to transmit forces to the user object, i.e., transmission systems which transmit forces with little backlash, undesired play, and high bandwidth. Furthermore, the transmission system is often necessary to provide mechanical advantage to increase the magnitude of forces output by a motor, thus allowing smaller sized motors to be used as desired in home consumer interface devices. For example, currently-available force feedback steering wheel controllers use a transmission system to provide mechanical advantage to output the desired strength of forces; otherwise, a large motor must be used to provide the desired force magnitude, which can be expensive and bulky and thus is undesirable. In the prior art, transmission systems such as a pulley system provide the mechanical advantage, where, for example, one pulley is coupled to another through highly-tensioned belts. A large pulley ratio (gear ratio) is typically not desirable since too much friction is generated, leading to distortion of output forces. However, even if small pulley ratio is used, side loads on the steering wheel or other user object can be created by the highly-tensioned belts on the pulleys. These side loads may also distort forces unless high-quality bearings on the pulleys and other high-quality rotatable parts are used, which can greatly increase the expense of manufacturing the steering wheel controller. Such a result is not desirable in the competitive, low-cost consumer market. In other interface device embodiments, capstan drives are used, in which a cable rather than a belt is used between the pulley and drum. However, the capstan drive movement range of the prior art is limited, thus providing inherent limitations to the amount of mechanical advantage provided.

SUMMARY OF THE INVENTION

The present invention is directed to a high fidelity mechanical transmission system which, in a preferred embodiment, is used in a human-computer interface device connected to a host computer and which provides realistic force feedback to a user of the device. The interface device transmission system includes high bandwidth, low cost components well suited for the home consumer market.

More specifically, a transmission system of the present invention for transmitting motion and force between a driven object and an actuator includes an actuator stage coupled to the actuator and an output stage coupled to the actuator stage. The actuator stage includes a capstan pulley coupled to the actuator that is rotatable about a first axis. A capstan drum is rotatable about a second axis, and a flexible member, such as a cable, couples the capstan pulley to the capstan drum. The flexible member is coupled to the capstan drum at both ends of the flexible member, and the capstan pulley causes the capstan drum to rotate about the second axis for multiple revolutions. The output stage is coupled to the driven object to rotate the driven object. In the preferred embodiment, the output stage includes a second capstan pulley rigidly coupled to the actuator stage capstan drum and rotatable about the second axis, a second capstan drum rotatable about a third axis and coupled to the driven object, and a second flexible member, such as a cable, coupling the second pulley to the second drum. The capstan drums are preferably cylindrical, and a spring member is preferably coupled between one end of the flexible member and the capstan drum to provide tension in the flexible member. The capstan drum(s) can also include grooves for guiding the flexible member thereon.

Another aspect of the present invention provides an interface device for inputting motion signals to a connected host computer in response to manipulations of the interface by the user, and for providing force feedback to the user. The host computer preferably implements a graphical environment with which the user interacts using the interface device. For example, a game can be provided in which the user controls a computer-implemented vehicle using the interface device. The interface device includes a user manipulatable object, preferably a steering wheel, joystick, or like object, contacted and manipulated by a user and moveable in a rotary degree of freedom. A sensor detects motion of the user object and provides a sensor signal including information describing the user object motion. An actuator provides forces on the user object as commanded by the host computer. A capstan drive assembly couples the actuator to the user object and includes one or more stages. At least one of the stages includes a capstan pulley coupled to a capstan drum by a flexible member, such as a cable, so that the capstan drive assembly increases a magnitude of forces output on the user object from the actuator. The actuator stage of the drive assembly includes a cylindrical capstan drum that may rotate in multiple revolutions. The second or later stages may also include a capstan drum and pulley and the flexible member. The flexible member is coupled to the drum at both ends, and a spring member is preferably coupled between one end and the drum to provide a spring tension. A stop mechanism can be included for limiting movement of the user object to a desired angular range. A speed reduction device may also be coupled to the actuator or other component to reduce a top rotational speed of the user manipulatable object to a maximum desired rotational speed.

In another aspect of the present invention, a method is provided for transmitting forces from an actuator to a driven object. An actuator is caused to output a force on a first capstan pulley coupled to a shaft of the actuator and causing the first capstan pulley to rotate. A first capstan drum is coupled to the first capstan pulley by a first cable and is rotated in conjunction with the first capstan pulley for multiple revolutions, where the first cable is coupled to the first drum at each end of the cable. A second capstan pulley is rotated in conjunction with the first capstan drum, and a second capstan drum is rotated in conjunction with the second capstan pulley. The second capstan drum is coupled to the second capstan pulley by a second cable, where the second capstan drum is coupled to the driven object. The first capstan drum can be cylindrical and include grooves for guiding the cable. A spring member can be coupled between one end of said first cable and said first capstan drum. In another method for interfacing a user with a graphical simulation implemented by a host computer, a rotatable user manipulatable object graspable by a user is provided, motion of the user object is sensed, and a force from an actuator is output on the user object. Furthermore, mechanical advantage for the force is provided from a capstan drive mechanism having a multiple stages, each stage including a pulley coupled to a cylindrical drum by a flexible member. A first stage preferably scales a force output by the actuator, and one or more additional stages scale a force output by the first stage, where a force output by the last stage is output on the user object. Control signals can also be sent to the host computer from an input device selected by the user and separate from the motion of the user object, such as buttons or switched provided on the interface device.

The method and apparatus of the present invention provides a transmission system and force feedback interface device that provides high bandwidth, realistic forces to a user of the device. The capstan drive mechanism provides to output forces a mechanical advantage superior to designs in the prior art which use an equivalent-sized motor. In addition, the transmission system of the present invention allows low friction and ease of manufacturing and assembly, thus providing a device well suited for the consumer market.

These and other advantages of the present invention will become apparent to those skilled in the art upon a reading of the following specification of the invention and a study of the several figures of the drawing.

BRIEF DESCRIPTION OF THE DRAWINGS

FIG. 5 is a perspective view of an alternative embodiment of an interface device including a speed reduction device of the present invention.

DETAILED DESCRIPTION OF PREFERRED EMBODIMENTS

Figure 1:
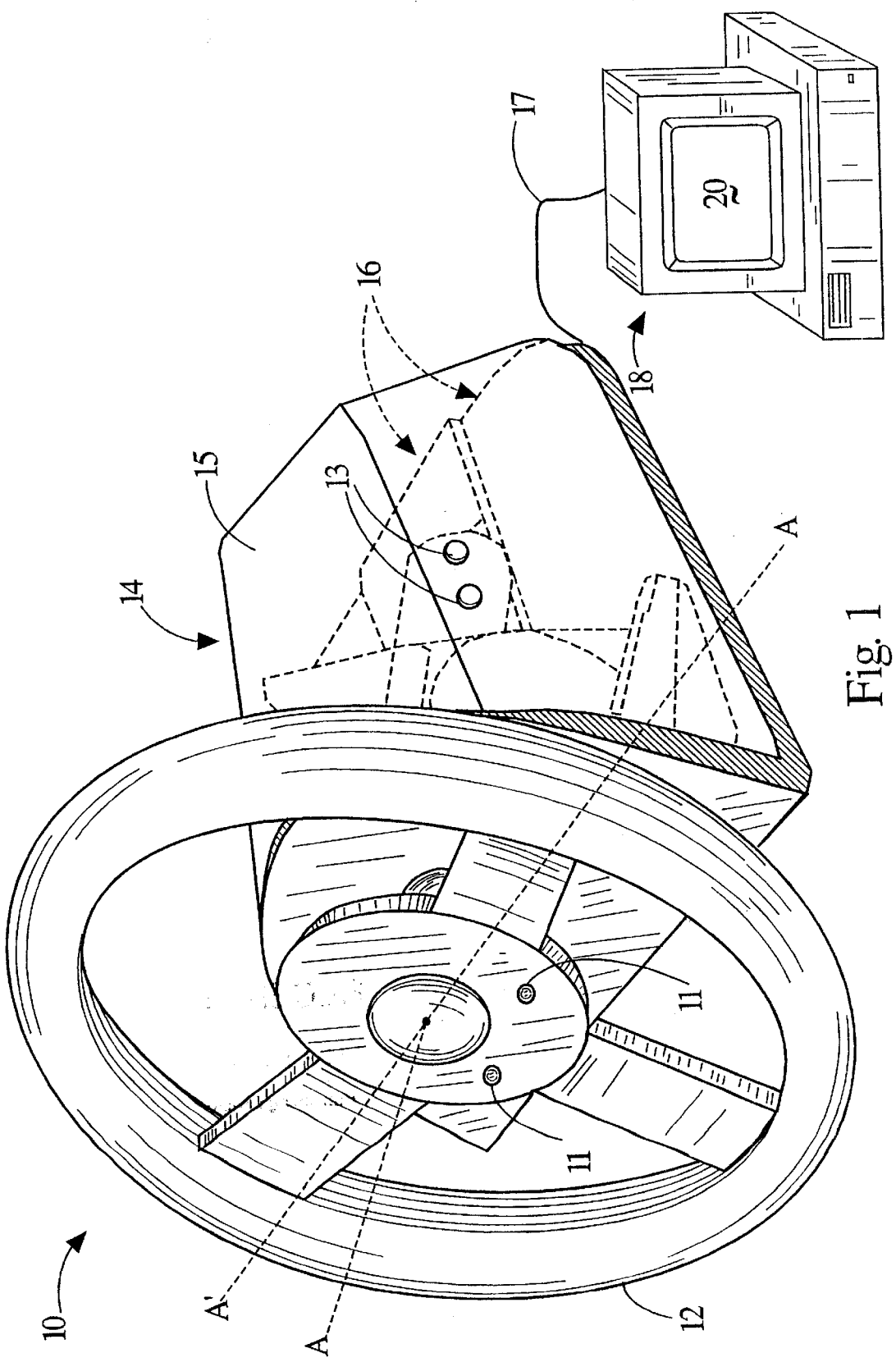
FIG. 1 is a perspective view of a force feedback interface device and system suitable for use with the present invention.

FIG. 1 is a perspective view of a force feedback interface device 10 suitable for use with the transmission system of the present invention. Device 10 is capable of providing input to a host computer based on the user's manipulation of the device and capable of providing force feedback to the user of the steering wheel based on events occurring in a program implemented by the host computer. The transmission device of the present invention will be described with reference to the interface device 10. However, the transmission system described herein may also be used in other devices or applications that require high bandwidth force, and motion transmission, low backlash, and/or high mechanical advantage, such as radar antennae, satellite dishes, precise measurement systems, or other devices.

Interface device 10 includes a wheel 12, a base or support 14, an interface 16, and a host computer 18. Steering wheel 12 is an object that is preferably grasped or gripped and manipulated by a user. By "grasp," it is meant that users may releasably engage or contact a portion of the object in some fashion, such as by hand, with their fingertips, etc. In the described embodiment, wheel 12 is a tube provided in a roughly circular, toroidal shape so that a user's hands may comfortably grasp the wheel at any point of its circumference and move it in the provided degree of freedom. It should be noted that the term "steering wheel" or "wheel" as used herein, indicates an object or manipulandum 12 generally shaped to be grasped or contacted by a user and moved in a rotary degree of freedom. Thus, a solid or hollow wheel, a half or partial wheel, a cylinder, rectangular-shaped object, flat strip, steering bar or grip having bent ends, or any type of grip that may be rotated by the user can be considered a "steering wheel."

In other embodiments of interface device 10, a wide variety of other types of user objects 12 can be used. For example, a joystick having one or more degrees of freedom can be provided, as well as a mouse, stylus, medical instrument, sphere, cubical- or other-shaped hand grips, a receptacle for receiving a finger or a stylus, or other objects.

Base 14 supports the steering wheel 12 on a grounded surface, such as a table top, desk surface, floor, etc. Within the housing 15 of base 14 is an interface 16 for interfacing mechanical and electrical input and output between the wheel 12 and host computer 18 implementing the application program, such as a simulation or game environment. Interface 16 preferably includes a mechanical portion and an electrical portion for interfacing motion with electrical signals and vice-versa. The mechanical portion of the interface 16 provides a rotary degree of freedom to wheel 12 about axis A. In other embodiments, additional degrees of freedom can be provided. For example, the wheel 12 might be operative to translate in a linear degree of freedom along axis A, toward or away from the base 14, to control a different function of a simulated vehicle, such as velocity. Or, the wheel or a portion of the wheel (or grip, bar, etc.) might be operative to rotate about another axis, such as axis A'. These additional degrees of freedom can also be sensed and/or actuator similarly to the main rotary degree of freedom, as described below.

Additional input controls can be provided on the wheel 12 or on the base 14. For example, buttons 11 can be provided on the center hub of wheel 12, or the entire central area of the hub can be a button. Also, controls such as buttons 13 can be provided on base 14 and selected by the user while using the wheel 12. In other embodiments, different types of controls can be provided, such as dials, switches, levers, contact or light sensors, etc. Separate controls can also be connected to the device 10 through wires or other transmission means. For example, a separate foot pedal unit coupled to device 10 by a bus or cord can send a signal to device 10 and host 18 to control the acceleration of a simulated vehicle while wheel 12 steers the vehicle.

The electronic portion of interface 16 translates the mechanical motion of the wheel 12 into an electrical form which can be interpreted by host computer 18. The user manipulates wheel 12 and the position of the wheel in its degree of freedom is read by a position sensor of the interface 16. The sensor then provides position information to host computer 18 and any application program implemented by the host. In addition, host computer 18 and/or interface 16 provide force feedback signals or commands to an actuator included in interface 16, and the actuators generate forces on wheel 12 in the rotary degree of freedom. The user experiences the forces generated on the wheel 12 as realistic simulations of force sensations such as jolts, textures, "barrier" forces, and the like. The electronic portion of interface 16 is preferably included within the base 14 of the wheel device 10, but can alternatively be included in host computer 18 or as a separate unit with its own housing. In the preferred embodiment, interface 16 includes a local microprocessor distinct and separate from any microprocessors in the host computer 18 to control force feedback on wheel device 10 independently of the host computer, as well as sensor and actuator interfaces that convert electrical signals to appropriate forms usable by the mechanical portion of interface 16 and host computer 18. A suitable embodiment of the electrical portion of interface 16 is described in detail with reference to FIG. 6.

The interface 16 can be coupled to the computer 18 by a bus 17, which communicates signals between interface 16 and computer 18. In some embodiments, bus 17 can provide power to the interface 16. In other embodiments, signals can be sent between interface 14 and computer 18 by wireless transmission/reception. The interface 16 can also receive inputs from other input devices or controls that are associated with steering wheel device 10 and can relay those inputs to computer 18. For example, commands sent by the user activating a button, lever, or dial on wheel 12 or base 14 can be relayed to computer 18 by interface 16 to implement a command or cause the computer 18 to output a command to the interface 16. Such input devices are described in greater detail with respect to FIG. 6.

Host computer 18 is preferably a personal computer or workstation, such as an IBM-PC compatible computer or Macintosh personal computer, or a SUN, Hewlett-Packard, or Silicon Graphics workstation. For example, the computer 18 can operate under the Windows™ or MS-DOS operating system in conformance with an IBM PC standard. Alternatively, host computer system 18 can be one of a variety of home video game systems commonly connected to a television set, such as systems available from Nintendo, Sega, or Sony. In other embodiments, home computer system 18 can be a "set top box" which can be used, for example, to provide interactive television functions to users, or a "network" or "internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 18 preferably implements a host application program with which a user is interacting via steering wheel 12 and other peripherals, if appropriate, and which can include force feedback functionality. For example, the host application program can be a simulation, video game, Web page or browser that implements HTML or VRML instructions, scientific analysis program, virtual reality training program or application, or other application program that utilizes input of wheel 12 and outputs force feedback commands to the wheel 12. Herein, for simplicity, operating systems such as Windows™, MS-DOS, MacOS, Unix, etc. are also referred to as "application programs." In one preferred embodiment, an application program provides a simulation or game environment with which a user or user-controlled entity interacts. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of a car or aircraft might be considered a graphical object. The host application program checks for input signals received from the electronics and sensors of interface 16, and outputs force values and/or commands to be converted into forces on wheel 12. Suitable software drivers which interface such simulation software with computer input/output (I/O) devices are available from Immersion Human Interface Corporation of San Jose, Calif.

Display device 20 can be included in host computer 18 and can be a standard display screen (LCD, CRT, etc.), 3-D goggles, or any other visual output device. Typically, the host application provides images to be displayed on display device 20 and provides other feedback, such as auditory signals. For example, display screen 20 can display images from a game or simulation. Images describing a moving, first person point of view can be displayed, as in a virtual reality game. Or, images describing a third-person perspective of objects, backgrounds, etc. can be displayed. Other types of graphical environments implemented by host computer 18 can be displayed in other embodiments.

Figure 2:
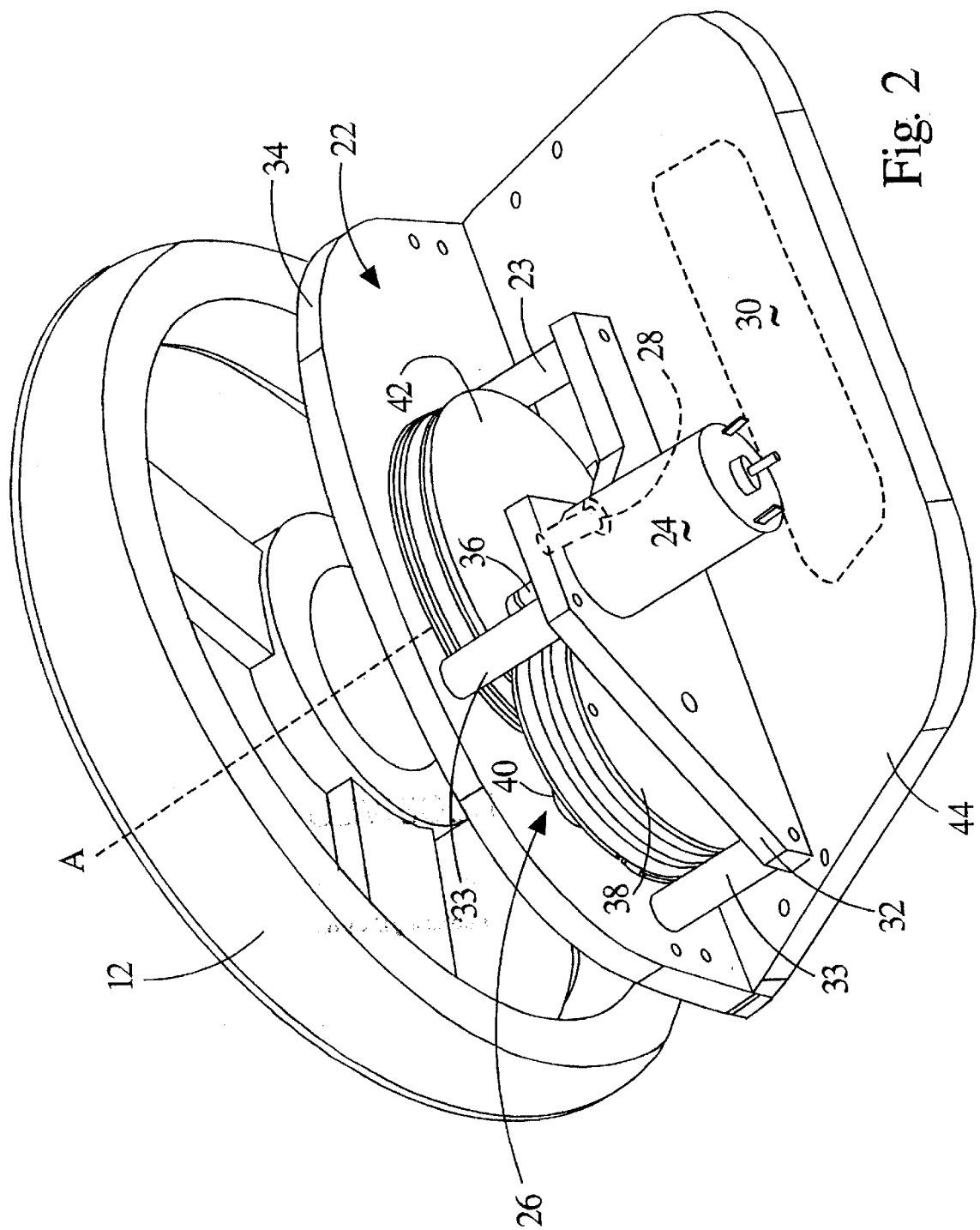
FIG. 2 is a perspective view of the interface device of FIG. I showing the interface inside the housing of the device.

FIG. 2 is a perspective view of the preferred embodiment of the wheel interface device 10 with the cover portion of base housing 15 removed, showing the mechanical portion 22 of interface 16 for providing mechanical input and output in accordance with the present invention. Mechanical portion 22 includes an actuator 24, a capstan drive assembly 26, and a sensor 28. The electronic portion 30 of the interface 16 is also preferably positioned within the base housing 15.

Actuator 24 outputs forces in response to commands from the electronic portion 30 of the interface 16. In the described embodiment, actuator 24 is a rotary DC motor that rotates a shaft coupled to the capstan drive mechanism 26. Due to the mechanical advantage provided by the capstan drive mechanism 26, the actuator 24 need not have a relatively large size to produce realistic forces on wheel 12. Actuator 24 is grounded by securing its housing to a grounded plate 32 that is coupled to base 22, where plate 32 preferably is angled approximately perpendicularly to the axis of rotation A. Actuator 24 also preferably includes a skewed rotor to minimize the magnetic "cogging" effect that can occur with traditional DC motors to distort the fidelity of forces. Actuators with skewed rotors are described in greater detail in co-pending U.S. patent application Ser. No. 08/784,803, filed Jan. 16, 1997, which is incorporated by reference herein. In other embodiments, other types of actuators may be used to provide forces or resistance to motion of the steering wheel 12. For example, a pneumatic or hydraulic piston or actuator, a voice coil actuator, passive brake, damper element, or other type of actuator can be used.

Capstan drive mechanism 26 is provided to increase the output force from the actuator 24 as applied to the steering wheel 12. Capstan drive mechanism 26 is coupled to the rotating shaft of actuator 24, and is coupled to a shaft of steering wheel 12. In the described embodiment, the mechanism includes capstan drums and capstan pulleys which are rotatably coupled to either grounded plate 32 or to a grounded front panel 34, where the plate 34 and panel 32 are approximately parallel to each other. Thus, the shaft of steering wheel 12 extends through and is rotatably coupled to the front panel 34, and the capstan drums are coupled to front panel 34 or plate 32. Support posts 33, or similar supports, preferably couple the plate 32 to the panel 34 and space plate 32 and panel 34 at the desired distance from each other. In the preferred embodiment, the mechanism 26 preferably includes multiple stages for scaling the output force and provides minimal friction and inexpensive parts. A two stage mechanism is illustrated; thus, a first capstan pulley 36, a first capstan drum 38, and a second capstan pulley 40 are coupled to grounded plate 32, and a second capstan drum 42 is coupled to front panel 34. The components and operation of the capstan drive mechanism 26 is described in greater detail with reference to FIG. 3.

A sensor 28 is provided to sense the rotation of the steering wheel 12 and report an electrical signal to the electronic portion 30 of the steering wheel device 10. Sensor 28, in the described embodiment, is coupled to a rotating shaft of the second capstan drum 42, which is coupled to and rotates in accordance with the steering wheel 12. In alternate embodiments, the sensor 28 can be positioned at other rotating positions of the interface device. For example, sensor 28 can be provided on the rotating shaft of first capstan drum 36. In such a position, since the first capstan drum 36 rotates at a different rate than the steering wheel 12, the electronic portion 30 of the interface 16 or host computer 18 can take the different rotational rate into account to determine the actual rotational position of the wheel 12. In the described embodiment, sensor 28 is an analog potentiometer having a body coupled to grounded plate 32, and a rotating shaft coupled to wheel 12 or shaft 57. Alternatively, the sensor 28 can be a lateral effect photo diode; for example, an emitter can be placed on the rotating shaft 57, and a detector can be coupled to plate 32, e.g., a detector sector or ring that detects the beam emitted from the emitter parallel to axis A toward plate 32 as the beam rotates about axis A. A digital encoder (e.g. having an encoder wheel), a magnetic encoder, etc. may also be used as sensor 28. In yet another embodiment, a "light pipe" can be used and is described in co-pending patent application Ser. No. 08/881,691, filed Jun. 24, 1997 by Schena et al., and incorporated by reference herein. In other embodiments, sensor 28 and actuator 24 can be included in a single transducer housing, for example, at the position of actuator 24.

Electronic portion 30 is preferably provided on a bottom support plate 44 of the base 14 and includes electronic components such as amplifiers, microprocessors, other digital circuitry, power supply, and other components as detailed with reference to FIG. 6, below.

In other embodiments, additional members or components can be included in interface device 10 to provide the desired degrees of freedom for user object 12. For example, steering wheel 12 may be provided with translational, linear degree of freedom along axis A. Such a linear degree of freedom can be translated into a rotary degree of freedom for use with a capstan drive mechanism 26 using mechanisms well known in the art. For example, a friction roller can be rotated by a linearly-moving member that frictionally engages the roller at a tangential point of the roller. Or, a universal joint such as a ball joint can connect a linearly-moving member to a rotationally-moving member. Other types of user objects may also be used similarly. Additional degrees of freedom can also be provided in interface device 10 which are not coupled to a capstan drive mechanism 26 of the present invention.

Figure 3:
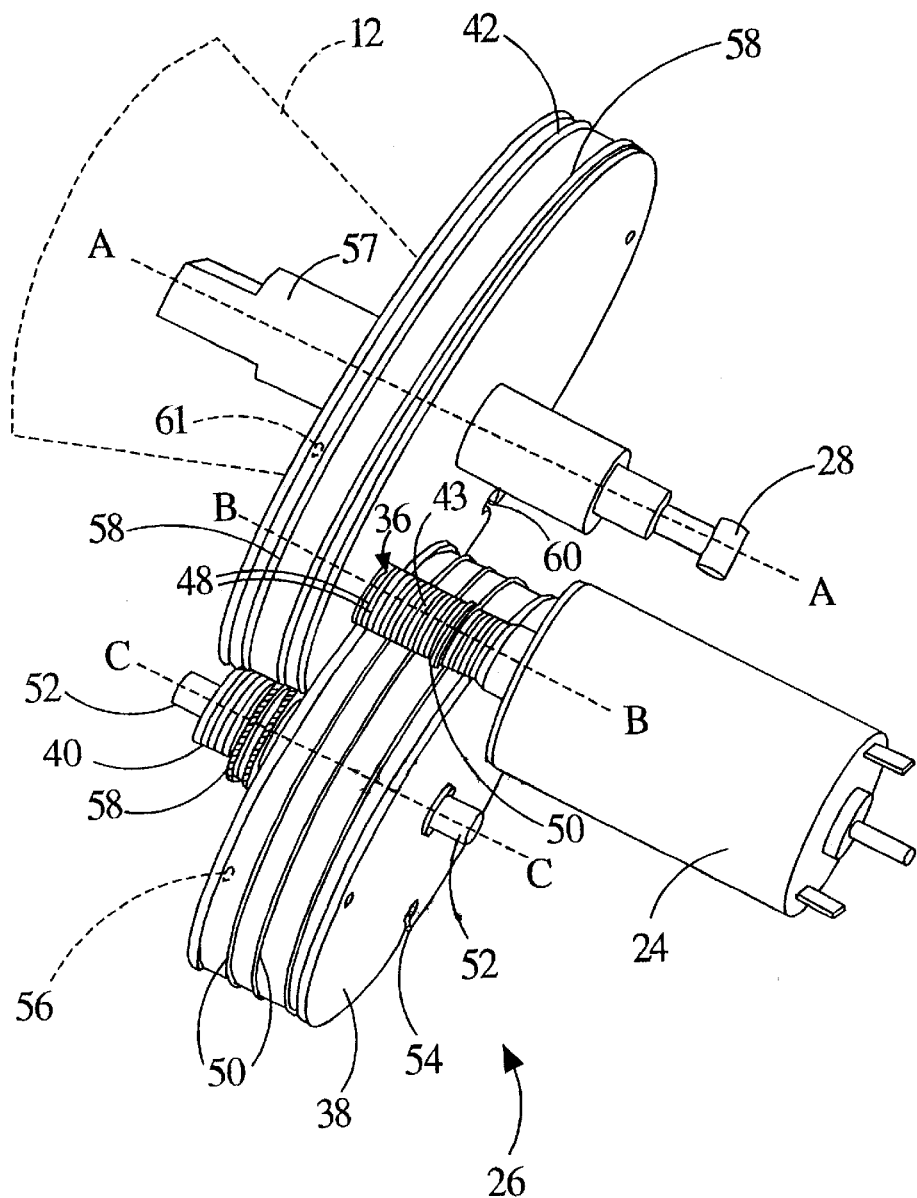
FIG. 3 is a perspective view of the transmission mechanism of the present invention.

FIG. 3 is a perspective view of the capstan drive mechanism 26 of the present invention used in the steering wheel interface device 10. Capstan drive mechanism 26 includes first capstan pulley 36, first capstan drum 38, second capstan pulley 40, and second capstan drum 42.

The first stage of capstan drive mechanism 26 includes first capstan pulley 36 and firs capstan drum 38. First capstan pulley 36 is rigidly coupled to the rotatable shaft of actuator 24 and thus may rotate about axis B. Preferably, the housing of actuator 24 is coupled to grounded plate 34 (as shown in FIG. 2), so that capstan pulley 36 is also grounded and rotationally coupled to actuator 24. Pulley 36 is rotationally fixed to the actuator shaft; in some embodiments, pulley 36 can also be allowed to move along axis B. First capstan pulley 36 is coupled to first capstan drum 38 by a first cable 50. First capstan drum 38 is preferably provided as a circular-shaped (cylindrical) drum that is rigidly coupled to a central shaft 52, where shaft 52 is rotatably coupled to the grounded plate 34 so that drum 38 and shaft 52 are rotatable about axis C. Drum 38, pulley 40, and shaft 52 are rigidly coupled together; thus, drum 38 and pulley 40 rotate together. Drum 38 and pulley 40 need not be translationally fixed; e.g. in an alternative embodiment, pulley 40 can translate with the cable along axis C. Cable 50 is wrapped around both first pulley 36 and first drum 38, thereby coupling the pulley and drum so that drum 38 rotates when pulley 36 is rotated by actuator 24. Cable 50 preferably has an approximately circular cross-section.

Cable 50 is preferably wrapped around pulley 36 and drum 38 multiple times to allow the drum 38 to rotate for multiple revolutions. In the described embodiment, the cable 50 is wrapped around pulley 36 two times, and is wrapped around first drum 38 three and a half times, where one end of the cable 50 is tied to the first drum 38 at a position 54, and the other end of the cable 50 is tied to the first drum 38 at position 56. Preferably, spring tension is provided at position 56, which is described in greater detail below. In other embodiments, the cable 50 can be wrapped around drum 50 and/or pulley 36 for additional (or less) times. For example, the three and a half turns (or "windings") on drum 38 are adequate in the described embodiment to provide about 180 degrees of rotation to the steering wheel 12. Four and a half to five turns about drum 38 can provide about 270 degrees of rotation. Additional turns of the cable about the drum can provide a greater rotation range as desired.

The multiple wraps of cable around drum 38 are advantageous in the present invention since they allow the capstan drum 38 to rotate for multiple revolutions. This allows the capstan drive mechanism 26 to provide mechanical advantage to a much greater range of rotation of user object 12. In the prior art, capstan drives included drums that rotate only a fraction of a complete revolution, thereby severely limiting the rotational range of any member or user object coupled to the capstan drive. In addition, the multiple rotations of the drum allow diameter of the drum 38 to be made smaller, which is desirable for consumer products such as interface device 10. The multiple revolutions of cable 50 on pulley 36 allow a much greater grip of the cable on the pulley, leading to less slipping, less friction, and greater fidelity in transmitted forces. In the preferred embodiment, pulley 36 also includes grooves 48, similar to threads on a screw. Since cable 50 is wrapped multiple times around the pulley, the grooves 48 function to guide the multiple wraps on the pulley as the pulley is rotated. Without the grooves, the cable would tend to migrate to one side of the pulley and slip off the edge of the pulley. In addition, the grooves 48 allow the cable to be routed onto the capstan drive mechanism more easily in a manufacturing environment. In alternate embodiments, the first capstan drum 38 can be provided with grooves in its edge instead of (or in addition to) providing grooves in pulley 36 to guide the multiple wraps of cable 50 on the drum 38. In some embodiments, it may be easier in a manufacturing process to provided grooves in drum 38 rather than pulley 36.

The second illustrated stage of the capstan mechanism includes second capstan pulley 40 and second capstan drum 42. Second capstan pulley 40 is rigidly coupled to drum 38 (or rigidly coupled to shaft 52). Second capstan pulley 40 is thus rotatable about axis C with capstan drum 38. In the described embodiment, the central shaft 52 is rotatably coupled to the front panel 34 at the shaft end not coupled to grounded panel 32 (alternatively, shaft 52 can be coupled at only one end to plate 32 or panel 34). A second capstan drum 42 is rigidly coupled to the wheel shaft 57 of steering wheel 12 at axis A, where the wheel shaft 57 is rotatably coupled to the front panel 34 (shown in FIG. 2). Thus, when second drum 42 rotates, the steering wheel 12 rotates in unison. In the described embodiment, second capstan drum 42 is a circular, cylindrical drum. Drum 42 (and drum 38) can be of any convenient diameter, as long as the desired scale ratio is achieved (described below). Second capstan pulley 40 is coupled to second capstan drum 42 by a cable 58, which is preferably wrapped multiple times around pulley 40 and multiple times around drum 42. In the preferred embodiment, cable 58 is wrapped four times around pulley 40 and two times around drum 42. As with the first capstan drum 38 and pulley 36, the cable 58 can be wrapped around pulley 40 and/or drum 42 additional or less times to provide a different rotational range (the cable need only be wrapped around drum 42 ½ times to allow 180 degrees of travel for steering wheel 12). Cable 58 is preferably of a larger thickness than cable 50 since a greater force must be transmitted between second pulley 40 and second drum 42 than between first pulley 36 and first drum 38 (i.e., the force has been scaled higher when received by the second stage after the first stage). Pulley 40 preferably includes grooves similar to pulley 36, but can be provided without grooves in alternate embodiments.

The pulleys 36 and 40 and drums 38 and 42 need not be provided with grooves or threads for the wraps of cable 58 if only one wrap of cable around the respective component is provided. If multiple wraps are provided on either drum, then grooves on the corresponding pulley (or the drum itself) should be included to prevent the cable from slipping of the edge of the pulley (or if a large pulley is used). Of course, grooves can be provided in pulley 40 and/or drum 42 if desired. Cable 58 preferably is tied at both ends to drum 42, where a first end is coupled at position 60 and the second end is spring tensioned at a position 61, as described in greater detail below. In an alternative embodiment, cable 58 can be wrapped for additional times on drum 42 to relieve tension on the spring coupled at one end of the cable. This can prevent tension on the cable from over-tensioning the spring.

The capstan drive mechanism 26 of the present invention provides substantial advantages over the prior art mechanisms. Two stages of capstan mechanisms are provided in succession, where the first stage includes pulley 36, first drum 38, and cable 50, and where the second stage includes pulley 40, second drum 42, and cable 58. Each stage increases the magnitude of the forces output by the actuator on the wheel 12 by a large factor. It should be noted that more than two stages can be provided in capstan drive mechanism 26 for additional mechanical advantage. Additional stages can be coupled to previous stages similarly as the second stage is coupled to the first stage described above. For example, if additional stages are added, each drum of each stage can be made smaller to achieve the same mechanical advantage since each stage contributes to the overall mechanical advantage.

Each stage should be designed with an appropriate pulley to drum size ratio such that the mechanical advantage of all stages sums to a total desired mechanical advantage. Thus, if the first stage of a two stage mechanism provides a 4:1 mechanical advantage, and the second stage provides a 5:1 mechanical advantage, the total advantage is 20:1. Each stage provides a mechanical advantage based on the relative sizes of pulley and drum in a stage such that the mechanical advantage provided by one stage is the radius of the drum divided by the radium of the pulley. The mechanical advantage of each stage is multiplied together to result in the total mechanical advantage. Thus, a total mechanical advantage of 20 can be provided, for example, by making pulleys 36 and 40 one inch in diameter and making drum 38 four inches in diameter and drum 42 five inches in diameter. For example, using the proportions of drums and pulleys and the distances approximately shown in FIG. 3, a scaling of 40:1 can be achieved between the force output by actuator 24 and the force felt by the user on steering wheel 12. With the relatively larger mechanical advantage provided by such a scheme, a much smaller and inexpensive motor 24 can be used to output forces to achieve the same (or better) quality of forces as in the prior art. In addition, since the capstan drives have very little friction, forces are scaled to an even greater extent than the frictional drives of the prior art (such as belt drives). Furthermore, the capstan drive systems provide this mechanical advantage without introducing backlash to the system. In addition, the capstan drive mechanisms provide no large side loads on the pulleys or drums, unlike the highly-tensioned belt drives of the prior art interface devices, such that expensive bearings are not necessary in the present invention to reduce friction. Since each end of the cables 50 and 58 is coupled to a drum 38 or 42 (or alternatively to a pulley), the tension in the cable can be properly and easily adjusted using a spring tension provided by a spring coupled at one end of the cable (described below). Thus there is no need to adjust the highly-tensioned loops of traditional belts provided between pulleys.

A further advantage of the capstan drive mechanism of the present invention is ease of assembly and manufacture. As explained above, the cables are easier to wind on the pulleys than assembling highly-tensioned belts as in the prior art. In addition, the configuration of drums 38 and 42, pulleys 36 and 40, and motor 24 allow easier assembly. For example, the first drum 38, motor 24, and pulley 36 can be initially coupled to plate 32 and the cable 50 can be wrapped between pulley 36 and drum 38. Since drum 42 and panel 34 are not yet placed, there is free access to the first stage for winding cable 50. Second drum 42 can then be installed and aligned with pulley 40, and cable 58 can be wrapped on pulley 40 while access is provided before panel 34 is placed. Panel 34 is then placed over shaft 57 and 42 and fixed to plate 32 by posts 33, followed by the placement of the wheel 12 on the shaft 57.

Many of the above components and configurations can be changed in alternate embodiments. For example, a single stage capstan mechanism can alternatively be provided, where a single capstan pulley is coupled to a single capstan drum by a cable. However, to achieve the desired scaling of force magnitudes using the same size actuator as in FIG. 3, the capstan drum would have to be much larger, which in some embodiments is not practical. In other embodiments, one or both of the capstan drums 38 and 42 can be provided as sectors instead of circular disks, i.e. an angular portion of a circle can be used as disclosed in co-pending patent application Ser. No. 08/374,288, which is hereby incorporated by reference herein. Alternatively, one or more stages can provide a cylindrical drum, while one or more different stages can provide drums as sectors, e.g., the first stage drum can be cylindrical to allow multiple rotations while the second stage drum is a sector since multiple rotations of that stage may not be required. In yet other embodiments, other flexible members can be used in place of cable 50, such as cord, string, thread, or belt, of various materials. Furthermore, the second stage (or the last stage in a chain of stages) can be a belt drive mechanism using a belt loop on pulleys. Other types of drive mechanisms can be mixed with the capstan stages of the present invention in capstan drive mechanism 26.

In another alternate embodiment, an end of the cable 50 or 58 can be rigidly coupled to first or second capstan pulley 36 or 40, respectively, to prevent slippage of the cable on the pulley. For example, an end of the cable 58 can be secured to one point 43 at the middle of the pulley 40 or pulley 36. However, in such an embodiment, enough wraps around the pulley need be provided so that at least one point on the cable never leaves or moves along the pulley.

Capstan drive mechanism 26 can also be used in other types of interface devices. For example, a joystick that has rotational motion in two degrees of freedom can be provided with a capstan drive mechanism 26 for each degree of freedom. One example of this can be illustrated with reference to co-pending patent application Ser. No. 08/374,288, in which two single stage capstan drives are used. The multiple stage capstan drives of the present invention can be provided in place of the single stage drives, e.g., actuator 24 can be grounded similarly, and the rotating member can be coupled at the end of the second stage (e.g. to drum 42). The capstan drive mechanism 26 can similarly be used for other types of mechanisms, such as those disclosed in U.S. Pat. Nos. 5,623,582; 5,731,804; 5,767,839; 5,721,566; 5,805,140; and 5,825,308; and co-pending applications Ser. Nos. 08/664,086, 08/709,012, 08/736,161, and 08/881,691, all incorporated by reference herein.

FIG. 3 also illustrates sensor 28 provided on steering wheel shaft 57. Preferably, one portion of sensor 28 is coupled to ground, such as ground plate 32, and the other portion of the sensor moves with steering wheel 12. As described above, sensor 28 can be a potentiometer, a photo diode sensor, an optical encoder, a magnetic encoder, or other type of sensor. In alternate embodiments, the sensor 28 can be placed on shaft 52 to measure the rotation of the wheel 12. However, it is typically not as desirable in such a location since the shaft 52 rotates multiple times for each rotation of steering wheel 12, unlike the shaft 57. Thus, if sensors senses the rotation of shaft 52, a counter or other device is needed to keep track of the number of revolutions of the shaft 52. Alternatively, a "light pipe" sensor can be provided on shaft 57 or 52. Such an embodiment is described in greater detail in co-pending patent application Ser. No. 08/881,691. For example, the emitter can be coupled to shaft 57 at one end of the light pipe, and the light pipe can extend out perpendicularly to axis A such that the emitted beam is transmitted onto a detector grounded on plate 32, where the detector is shaped to cover the rotational range of the light pipe. The light pipe can alternatively be positioned on any of the multiple stages of the capstan drive mechanism 26. The light pipe is also quite suitable for smaller ranges of angular motion, such as in a joystick. For example, the light pipe can be used with capstan drive mechanism 26 on a joystick embodiment as described in U.S. Pat. No. 5,731,804.

Figure 4A:
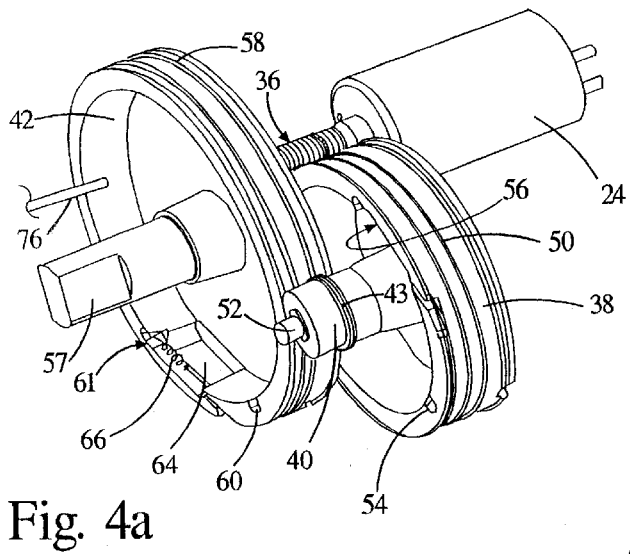
FIGS. 4a–d are top plan, front, side elevational, and perspective views of the mechanism of FIG. 3.
Figure 4B:
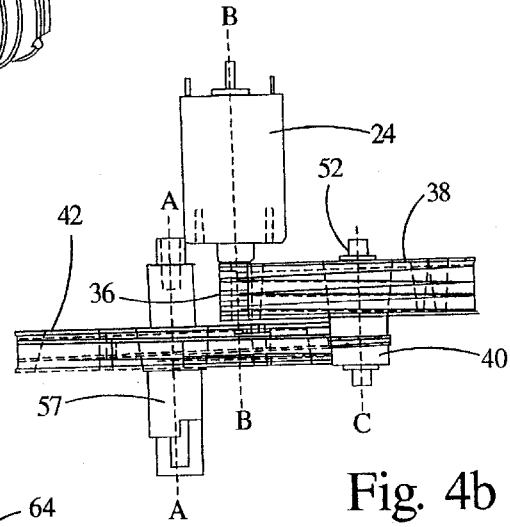
Figure 4C:
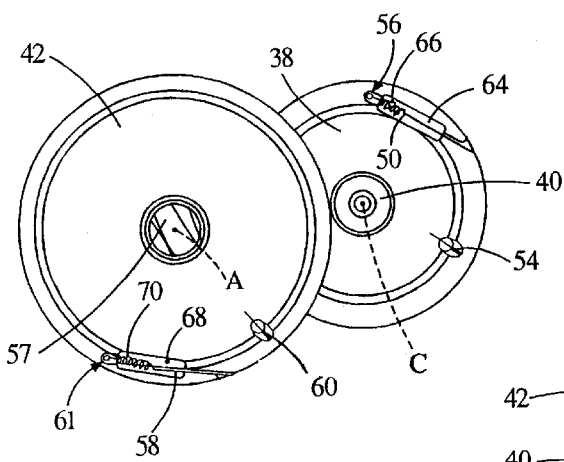
Figure 4D:
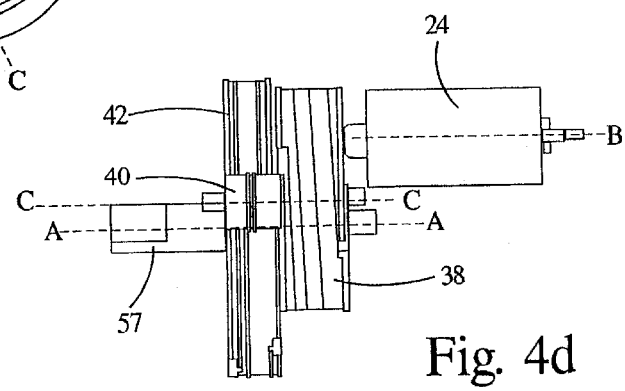

FIGS. 4a–4d are different views of the capstan drive mechanism shown in FIG. 3, where FIG. 4a is a perspective view, FIG. 4b is a top plan view, FIG. 4c is a front view, and FIG. 4d is a side elevation view. The capstan drums 38 and 42 preferably have much of their interior volume hollowed out as shown so that the drums are lighter and have less rotary inertia. FIGS. 4a and 4c illustrate the cable end position 56 on capstan drum 38, which in the described embodiment includes a groove 64 in the drum 38. The end of cable 50 is routed into the groove 64 and is coupled to one end of a spring 66. The other end of spring 66 is coupled to the drum 38 at point 56. When the cable 50 is installed, the cable is provided with enough tension so that spring 66 is partially tensioned. The spring 66 thus acts to tension the cable 50 and reduces any slack in the cable that may be introduced through motion and transmission of forces. Cable end position 61 on drum 42 similarly includes a groove 68 in the drum 42, where the end of cable 58 is routed into the groove 68 and is coupled to spring 70, which is coupled to the drum 42 at point 61. Spring 70 tensions cable 58 and reduces slack in cable 58 that may be later introduced.

The cable of the capstan drive mechanism 22 of the present invention is easier to tension than the belt drives of prior art transmissions because cable 50 or 58 is not provided in a continuous loop like the belts of the prior art. Each end of each cable is fixed to a drum 38 or 42, such that the cable is easier to wind and allows a spring to be placed at the end of the cable (such a spring is not easy to place in a continuous loop belt). The springs 66 and 70 provide additional tension in the cables 50 and 58 that reduce the manual tensioning required in the capstan drive mechanism.

The interface device 10 also preferably includes a hard stop to prevent the wheel 12 from rotating outside of a desired angular range. This prevents the cables 50 and 58 from winding off the end of the pulleys 36 and 42, respectively. Thus the hard stop should be engaged by the wheel 12 in either direction of rotation before the cables reach the end of the pulleys. The hard stop can be implemented in a number of ways; for example, a groove (not shown) can be provided in second capstan drum 42 which is blocked at the desired positions of the stops. A pin 76 can be coupled to front panel 34 and extend into the groove in the capstan drum 42. Thus, when the drum 42 rotates in accordance with wheel 12, the pin eventually engages the stops in the groove and blocks the wheel from further rotation. Alternatively, a pin can be provided on drum 42 which rotates within a groove provided in the front panel 34 and which engages stops within the groove. Stops can be placed at other positions on the interface device 10 alternatively or in addition to these stops. For example, a pin or other member can be positioned on shaft 52, shaft 57, or other rotating shafts of the capstan mechanism 26 which engages a grounded stop at a desired position, such as coupled to plate 32 or panel 34.

FIG. 5 is a perspective view of the steering wheel controller device 10 including a speed reduction element of the present invention. Since capstan drive mechanism 22 provides low friction transmission of forces, the steering wheel or other user object 12 can be easily and freely rotated by the user when no forces are being applied. Likewise, when a force causes the steering wheel 12 to rotate in a particular direction, and/or when the force is removed, the wheel will rotate easily in that direction. For example, the "free wheeling" velocity of the use object 12 is the velocity at which there is equilibrium, i.e., the force on the user object is balanced by the friction and resistance of the wheel. In some cases, a high free wheeling velocity can present a hazard for the user, since the rapidly moving wheel or other user object can cause injury to any portion of the user contacting the user object.

To prevent the user object 12 from achieving a dangerously high rotational velocity, a speed reduction device can be employed in the interface device 10. One embodiment of such a device is shown in FIG. 5. Shaft 80 of actuator 24 is rotated by the actuator to cause force on steering wheel 12 as transmitted by capstan drive mechanism 26. Fan blades 82 are rigidly coupled to the shaft 80 and thus rotate when the shaft rotates. The fan blades are operative to catch air as they spin and thus a damping force or resistance is created that resists the spin of the shaft. This damping force slows down the shaft and thus slows down the rotation of the steering wheel that is coupled to the shaft 80. Since the shaft 80 has many rotations in a single rotation of the steering wheel 12 due to the gear ratio provided by the capstan drive mechanism, the fan blades spin very fast compared to the rotation of the steering wheel. This causes the air resistance damping to immediately take effect no matter the rotational velocity of the steering wheel. Thus, the fan blades adjust the maximum velocity of the user object 12 for a given force on the user object, i.e., the maximum velocity is regulated by the fan blades. The size of the fan blades can also be chosen to limit the maximum speed of the user object that the actuator is capable of driving for a given force. For example, it may be desired to keep the speed of a steering wheel below 60 rpm. In alternate embodiments, other equivalent devices to fan blades may be used, such as air veins in a disc, etc.

A further function of the fan blades can be to cool down components in the base 14. Thus, for example, electronic portion 30 of the device 10 can be positioned to receive the air blowing from device 80. Components such as high frequency integrated circuits and amplifiers can benefit from this cooling function.

Figure 6:
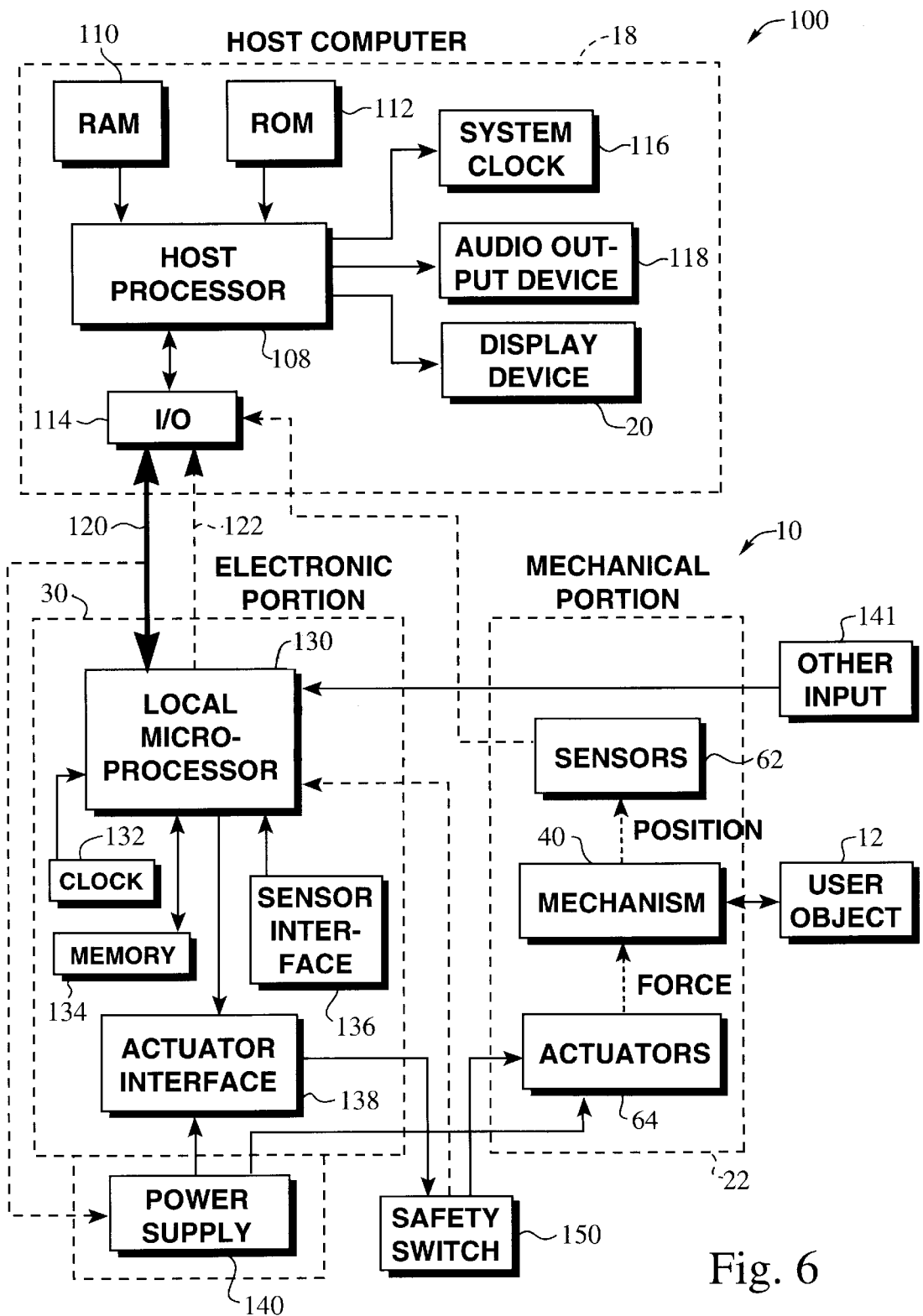
FIG. 6 is a block diagram of a system for controlling a force feedback interface device of the present invention.

FIG. 6 is a block diagram illustrating the electronic system 100 that includes interface device 10 and host computer 18 suitable for use with the present invention. Interface controller 10 includes a host computer 18, electronic portion 30, mechanical portion 22, and user object 12, which in the described embodiment is a steering wheel. Electronic portion 30, mechanical portion 22, and user object (wheel) 12 can also collectively be considered the interface device 10 that is coupled to the host computer. A similar control system is described in detail in U.S. Pat. No. 5,734,373, which is hereby incorporated by reference herein in its entirety.

As explained with reference to FIG. 1, computer 18 is preferably a personal computer, workstation, video game console, or other computing or display device. Host computer system 18 commonly includes a host microprocessor 108, random access memory (RAM) 110, read-only memory (ROM) 112, input/output (I/O) electronics 114, a clock 116, a display device 20, and an audio output device 118. Host microprocessor 108 can include a variety of available microprocessors from Intel, AMD, Motorola, or other manufacturers. Microprocessor 108 can be single microprocessor chip, or can include multiple primary and/or co-processors. Microprocessor 108 preferably retrieves and stores instructions and other necessary data from RAM 110 and ROM 112 as is well known to those skilled in the art. In the described embodiment, host computer system 18 can receive sensor data or a sensor signal via a bus 120 from sensors of system 10 and other information. Microprocessor 108 can receive data from bus 120 using I/O electronics 114, and can use I/O electronics to control other peripheral devices. Host computer system 18 can also output commands to interface device 104 via bus 120 to cause force feedback for the interface device 10.

Clock 116 is a standard clock crystal or equivalent component used by host computer 18 to provide timing to electrical signals used by host microprocessor 108 and other components of the computer system 18 and may also be used in determining force or position, e.g., calculating a velocity or acceleration from position values. Display device 20 is described with reference to FIG. 1. Audio output device 118, such as speakers, can be coupled to host microprocessor 108 via amplifiers, filters, and other circuitry well known to those skilled in the art. Host processor 108 outputs signals to speakers 118 to provide sound output to the user when an "audio event" occurs during the implementation of the host application program. Other types of peripherals can also be coupled to host processor 108, such as storage devices (hard disk drive, CD ROM drive, floppy disk drive, etc.), printers, and other input and output devices.

Electronic portion 30 is coupled to host computer system 18 by a bi-directional bus 120. The bi-directional bus sends signals in either direction between host computer system 18 and the interface device 104. Bus 120 can be a serial interface bus providing data according to a serial communication protocol, a parallel bus using a parallel protocol, or other types of buses. An interface port of host computer system 18, such as an RS232 serial interface port, connects bus 120 to host computer system 18. In another embodiment, an additional bus 122 can be included to communicate between host computer system 18 and interface device 13. Bus 122 can be coupled to a second port of the host computer system, such as a "game port", such that two buses 120 and 122 are used simultaneously to provide an increased data bandwidth. One serial interface bus that can be used in the present invention is the Universal Serial Bus (USB) that can provide force feedback signals and can also source power to drive actuators and other devices of the present invention.

Electronic portion 30 includes a local microprocessor 130, local clock 132, local memory 134, sensor interface 136, and actuator interface 138. Electronic portion 30 may also include additional electronic components for communicating via standard protocols on buses 120 and 122. In various embodiments, electronic portion 30 can be included in housing 15, in host computer 18, or in its own separate housing. Different components of portion 30 can be included in apparatus 102 or host computer 18 if desired.

Local microprocessor 130 preferably coupled to bus 120 and may be closely linked to mechanical portion 22 to allow quick communication with other components of the interface device. Processor 130 is considered "local" to interface device 10, where "local" herein refers to processor 130 being a separate microprocessor from any processors 108 in host computer 18. "Local" also preferably refers to processor 130 being dedicated to force feedback and sensor I/O of the interface device 10, and being closely coupled to sensors and actuators of the mechanical portion 22, such as within the housing of or in a housing coupled closely to portion 22. Microprocessor 130 can be provided with software instructions to wait for commands or requests from computer host 18, parse/decode the command or request, and handle/control input and output signals according to the command or request. In addition, processor 130 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 130 include the MC68HC711E9 by Motorola and the PIC16C74 by Microchip, for example. Microprocessor 130 can include one microprocessor chip, or multiple processors and/or co-processor chips. In other embodiments, microprocessor 130 can include digital signal processor (DSP) functionality.

For example, in one host-controlled embodiment that utilizes microprocessor 130, host computer 18 can provide low-level force commands over bus 120, which microprocessor 130 directly transmits to the actuators. In a different local control embodiment, host computer system 18 provides high level supervisory commands to microprocessor 130 over bus 120, and microprocessor 130 manages low level force control loops to sensors and actuators in accordance with the high level commands and independently of the host computer 18. In the local control embodiment, the microprocessor 130 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. Force feedback used in such a way is described in greater detail in co-pending U.S. Pat. No. 5,734,373, which is incorporated by reference herein. For example, a computer-controlled object is generated on computer screen 20 and a computer object or entity controlled by the user collides with the computer controlled object. High-level host commands can be used to provide the various forces associated with the collision in real time. Also, the local control mode microprocessor 130 can be helpful in increasing the response time for forces applied to the user object, which is essential in creating realistic and accurate force feedback. The microprocessor 130 can read the sensors of the device 10, provide the sensor data to the host, and execute an appropriate force process when the host indicates a collision takes place, thus freeing the host computer for other tasks. The host could implement program functions (such as displaying images) when appropriate, and synchronization commands can be communicated between processor 200 and host 18 to correlate the microprocessor and host processes.

Sensor signals used by microprocessor 130 are also reported to host computer system 18, which updates a host application program and outputs force control signals as appropriate. In an alternate embodiment, no local microprocessor 130 is included in interface device 10, and host computer 18 directly controls and processes all signals to and from the interface device 10.

A local clock 132 can be coupled to the microprocessor 130 to provide timing data, similar to system clock 116 of host computer 18; the timing data might be required, for example, to compute forces output by actuators 64 (e.g., forces dependent on calculated velocities or other time dependent factors). Local memory 134, such as RAM and/or ROM, is preferably coupled to microprocessor 130 in interface 100 to store instructions for microprocessor 130 and store temporary and other data. Microprocessor 130 may also store calibration parameters in a local memory 134 such as an EEPROM. Memory 134 may be used to store the state of the force feedback device, including a reference position, current control mode or configuration, etc.

Sensor interface 136 may optionally be included in electronic interface 100 convert sensor signals to signals that can be interpreted by the microprocessor 130 and/or host computer system 18. For example, sensor interface 136 can receive signals from a digital sensor such as an encoder and convert the signals into a digital binary number representing the position of a member or component of mechanical apparatus 14. An analog to digital converter (ADC) in sensor interface 136 can convert a received analog signal to a digital signal for microprocessor 130 and/or host computer 18. Such circuits, or equivalent circuits, are well known to those skilled in the art. Alternately, microprocessor 130 can perform these interface functions without the need for a separate sensor interface 136. Or, sensor signals from the sensors can be provided directly to host computer system 18, bypassing microprocessor 130 and sensor interface 136. Other types of interface circuitry 136 can also be used. For example, an electronic interface is described in U.S. Pat. No. 5,576,727, which is hereby incorporated by reference herein.

Actuator interface 138 can be optionally connected between the actuators 64 and microprocessor 130. Interface 138 converts signals from microprocessor 130 into signals appropriate to drive the actuators. Interface 138 can include power amplifiers, switches, digital to analog controllers (DACs), and other components. Such interfaces are well known to those skilled in the art. In alternate embodiments, interface 138 circuitry can be provided within microprocessor 130 or in the actuators. Interface device can receive its power from a power supply 140 and/or from some other source, such as a USB or power storage circuit, such as a battery or capacitor.

Mechanical portion 22 is coupled to electronic portion 30 and preferably includes one or more sensors 28, one or more actuators 24, and capstan drive mechanism 26. These components are described in detail above. Sensor 28 senses the position, motion, and/or other characteristics of wheel 12 along one or more degrees of freedom and provide signals to microprocessor 130 including information representative of those characteristics. Example of sensors suitable for embodiments described herein are optical encoders, as described above. Linear optical encoders, analog sensors such as potentiometers, non-contact sensors (Hall effect magnetic sensors or an optical sensor such as a lateral effect photo diode having an emitter/detector pair) can also be used. In addition, velocity sensors (e.g., tachometers) for measuring velocity of wheel 12 and/or acceleration sensors (e.g., accelerometers) for measuring acceleration of wheel 12 can be used. Furthermore, either relative or absolute sensors can be employed.

Actuator(s) 24 transmit forces to wheel 12 in one or more directions along one or more degrees of freedom in response to signals output by microprocessor 130 and/or host computer 18, i.e., they are "computer controlled." Typically, an actuator 24 is provided for each degree of freedom along which forces are desired to be transmitted. Actuator 24 can include two types: an active actuator and a passive actuator. Active actuators include linear current control motors, stepper motors, pneumatic/hydraulic active actuators, a torquer (motor with limited angular range), a voice coil actuator as described in the embodiments above, and other types of actuators that transmit a force to an object. A passive actuator can also be used for actuators 24, such as magnetic particle brakes, friction brakes, or pneumatic/hydraulic passive actuators, and generate a damping resistance or friction in a degree of motion.

Capstan drive mechanism 26 is preferably the assembly described above, but can also be implemented in other ways. In addition, the capstan drive mechanism 26 described herein can be used in conjunction with other mechanical interfaces for human-computer interface devices. For example, mechanisms disclosed in U.S. Pat. Nos. 5,731,804; 5,767,839; 5,721,566; 5,805,140; and co-pending patent applications Ser. Nos. 08/374,288, 08/400,233, 08/489,068, 08/560,091, 08/623,660, 08/664,086, 08/709,012, and 08/736,161, all incorporated by reference herein, can be provide with a similar capstan drive mechanism 26.

Other input devices 141 can optionally be included in system 10 and send input signals to microprocessor 130 and/or host computer 18. Such input devices can include buttons, such as buttons 11 on wheel 12, or buttons 13 provided on the housing 15 of the base 14. The other input devices can provide input signals used to supplement the wheel input from the user to the application program implemented by the host computer, such as a game, simulation, etc. Also, dials, switches, or other input mechanisms can be used.

Safety or "deadman" switch 150 can be included in interface device 10 to provide a mechanism to allow a user to override and deactivate actuator(s) 24, or require a user to activate actuator 24, for safety reasons. In the preferred embodiment, the user must continually activate or close safety switch 150 during manipulation of wheel 12 to activate the actuators 24. For example, the safety switch can be provided on the wheel itself at a location where the user grasps the wheel. If, at any time, the safety switch is deactivated (opened), power is cut to actuator 24 (or the actuator is otherwise deactivated) as long as the safety switch is opened. For example, one embodiment of safety switch is a mechanical or optical switch located on wheel 12. When the user covers an optical safety switch with a hand or finger, the sensor of the switch is blocked from sensing ambient light, and the switch is closed. The actuator 24 thus will function as long as the user covers the switch. Other types of safety switches 150 can also be used, such as an electrostatic contact switch. The safety switch can be provided between the actuator interface 138 and actuator 24 as shown in FIG. 6; or, the switch can be placed elsewhere. The state of the safety switch can be provided to the microprocessor 130 and/or to the host 18.

In some embodiments, multiple interface devices 10 can be coupled to a single host computer system 18 through bus 120 (or multiple buses 120) so that multiple users can simultaneously interface with the host application program (in a multi-player game or simulation, for example). In addition, multiple players can interact in the host application program with multiple interface devices 10 using multiple networked host computers 18, as is well known to those skilled in the art.

While this invention has been described in terms of several preferred embodiments, it is contemplated that alterations, permutations and equivalents thereof will become apparent to those skilled in the art upon a reading of the specification and study of the drawings. For example, other types of mechanical linkages and drive assemblies can be provided between the user object 12 and the electronic portion of the interface 16. Different types of stages can be mixed with the capstan stages of the present invention, such as a belt drive or gear drive. In addition, other types of actuators, sensors, and user objects can be used in other embodiments. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A transmission system for transmitting motion and force between a driven object and an actuator, the transmission system comprising:
    an actuator stage coupled to said actuator, said actuator stage including:
        a capstan pulley coupled to said actuator, said capstan pulley rotatable about a first axis by said actuator;
        a capstan drum rotatable about a second axis; and
        a flexible member having two ends and coupling said capstan pulley to said capstan drum, wherein said flexible member is coupled to said capstan drum at each end of said flexible member, and wherein said capstan pulley causes said capstan drum to rotate about said second axis for multiple revolutions; and
    an output stage coupled to said actuator stage, said output stage coupled to said driven object to rotate said driven object.

2. A transmission system as recited in claim 1 wherein said capstan pulley is a first capstan pulley, said capstan drum is a first capstan drum, and said flexible member is a first flexible member, and wherein said output stage includes:

a second capstan pulley rigidly coupled to said first capstan drum and rotatable about said second axis;

a second capstan drum coupled to said driven object, said second capstan drum rotatable about a third axis; and a second flexible member coupling said second capstan pulley to said second capstan drum, wherein said second flexible member is coupled to said second capstan drum at both ends of said second flexible member.

3. A transmission system as recited in claim 2 wherein said first, second and third axes are approximately parallel to each other.

4. A transmission system as recited in claim 1 wherein said flexible member is a cable.

5. A transmission system as recited in claim 2 further comprising an intermediate stage coupled between said actuator stage and said output stage, said intermediate stage including a third capstan drum and a third capstan pulley coupled together by a third flexible member.

6. A transmission system as recited in claim 2 wherein said first capstan drum is cylindrical.

7. A transmission system as recited in claim 1 further comprising a spring member coupled between one end of said flexible member and said capstan drum, said spring member providing tension in said flexible member to reduce slack in said flexible member.

8. A transmission system as recited in claim 1 wherein said capstan drum includes grooves for guiding said flexible member thereon, wherein said grooves run about a circumference of said capstan drum approximately perpendicular to an axis of rotation of said capstan drum.

9. A transmission system as recited in claim 1 wherein said driven object is rotatable about a third axis and is a user object manipulatable by a user about said third axis.

10. A transmission system as recited in claim 9 wherein said user object is a steering wheel.

11. A transmission system as recited in claim 9 wherein said user object is a joystick.

12. An interface device coupled to a host computer and inputting motion signals to said host computer in response to manipulations of said interface device by a user, said interface device providing force feedback to said user, said interface device comprising:

a user manipulatable object contacted and manipulated by a user and moveable in a degree of freedom;

a sensor coupled to said user manipulatable object that detects motion of said user manipulatable object, wherein said sensor provides a sensor signal including information describing said motion of said user manipulatable object in said degree of freedom;

an actuator that provides forces in said degree of freedom of said user manipulatable object, wherein said actuator is controlled from commands output by said host computer; and a capstan drive assembly coupling said actuator to said user manipulatable object, said capstan drive assembly including an actuator stage and an output stage, wherein said actuator stage includes a capstan pulley coupled to a cylindrical capstan drum by a flexible member having two ends, each end coupled to said capstan drum, said cylindrical drum having rotatable range over 360 degrees, and wherein a ratio of a diameter of said drum to a diameter of said pulley in said actuator stage increases a magnitude of forces output on said user manipulatable object from said actuator.

13. An interface device as recited in claim 12 wherein said capstan pulley is a first capstan pulley, said capstan drum is a first capstan drum, and said flexible member is a first flexible member, said output stage includes a second capstan pulley coupled to a second capstan drum by a second flexible member, said second capstan drum being coupled to said user manipulatable object, wherein both ends of said second flexible member are coupled to said second drum, and wherein a ratio of a diameter of said second pulley to a diameter of said second drum in said output stage increases a magnitude of forces output on said user manipulatable object from said actuator.

14. An interface device as recited in claim 13 wherein said user manipulatable object is rotatable about an axis.

15. An interface device as recited in claim 14 wherein said user manipulatable object is a steering wheel.

16. An interface device as recited in claim 14 wherein said flexible member of each of said stages of said capstan drive assembly is a cable having an approximately circular cross section.

17. An interface device as recited in claim 14 wherein said capstan drive assembly scales forces output by said actuator in a ratio of about 40:1.

18. An interface device as recited in claim 12 wherein said capstan drum includes grooves for guiding said flexible member thereon, wherein said grooves run about a circumference of said capstan drum approximately perpendicular to an axis of rotation of said capstan drum.

19. An interface device for as recited in claim 12 wherein said pulley includes grooves for guiding said flexible member thereon.

20. An interface device as recited in claim 13 wherein said first pulley is rotatable about a first axis, said first drum and said second pulley are rotatable about a second axis, and said second drum and said user manipulatable object are rotatable about a third axis.

21. An interface device as recited in claim 13 wherein said second flexible member is of greater thickness and is capable of transmitting forces of greater magnitude than said first flexible member.

22. An interface device as recited in claim 12 wherein said flexible member is wrapped a plurality of times around said capstan pulley and a plurality of times around said capstan drum.

23. An interface device as recited in claim 12 wherein said flexible member is coupled to said drum at one end, and further comprising a spring coupled between said end of said flexible member and said drum to provide a spring tension in said flexible member to reduce slack in said flexible member.

24. An interface device as recited in claim 14 wherein said sensors are lateral effect photo diodes including an emitter and a detector.

25. An interface device as recited in claim 24 wherein said sensor includes a light pipe for guiding light emitted by said emitter to said detector.

26. An interface device as recited in claim 14 further comprising a stop mechanism for limiting movement of said user manipulatable object to a desired angular range.

27. An interface device as recited in claim 14 further comprising a local microprocessor, separate from said host computer system and coupled to said host computer system by a communication bus, said microprocessor receiving sensor signals from said sensors and sending output control signals to said actuators to control a level of force output by said actuators.

28. An interface device as recited in claim 14 further comprising a speed reduction device coupled to said actuator for limiting a top rotational speed of said user manipulatable object, thereby increasing the safety of said interface device.

29. A steering wheel interface device for providing force feedback to a user of said steering wheel interface device, wherein a host computer is coupled to said steering wheel interface device and implements a graphical environment with which said user interacts, said steering wheel interface device comprising:

a steering wheel physically contacted and manipulated by a user in a rotary degree of freedom with respect to a ground surface;

a support base coupled to ground, said steering wheel rotatably coupled to said support base;

a sensor coupled to said steering wheel that detects rotary motion of said steering wheel, wherein said sensor provides a sensor signal to said host computer including information describing said motion of said steering wheel in said rotary degree of freedom;

an actuator coupled to said support base that provides forces in said rotary degree of freedom of said steering wheel, wherein said actuator is controlled from commands output by said host computer; and a capstan drive mechanism coupling said actuator to said steering wheel, said capstan drive mechanism including:

a first stage including a first capstan pulley rigidly coupled to said actuator, a first capstan drum rotatably coupled to said support base, and a first cable coupled between said first capstan drum and said first capstan pulley for transmitting force and motion between said first capstan drum and said first capstan pulley, wherein said first cable is wrapped around said first capstan drum a plurality of times, allowing said first capstan drum to rotate a plurality of times, and wherein said first cable has two ends coupled to said first capstan drum; and a second stage including a second capstan pulley rigidly coupled to said first capstan drum, a second capstan drum rigidly coupled to said steering wheel, and a second cable coupled between said second capstan pulley and said second capstan drum;

wherein said capstan drive mechanism provides mechanical advantage to forces output by said actuator on said steering wheel.

30. A steering wheel interface device as recited in claim 29 wherein said second capstan pulley is rigidly coupled to a shaft of said first capstan drum such that said second capstan pulley and said first capstan drum rotate about a single axis.

31. A steering wheel interface device as recited in claim 29 wherein said first cable is coupled to said first capstan drum at one end, and further comprising a spring coupled between said end of said first cable and said first capstan drum to provide a spring tension in said first cable to reduce slack in said first cable.

32. A steering wheel interface device as recited in claim 29 wherein said graphical environment includes a game wherein said steering wheel interface device steers a computer-implemented vehicle.

33. A steering wheel interface device as recited in claim 29 wherein said first capstan drum includes grooves for guiding said cable thereon.

34. A method for transmitting forces from an actuator to a driven object, the method comprising:

causing said actuator to output a force on a first capstan pulley coupled to a shaft of said actuator and causing said first capstan pulley to rotate;

rotating a first capstan drum in conjunction with said first capstan pulley, wherein said first capstan drum is coupled to said first capstan pulley by a first cable, said first cable being coupled to said first capstan drum at each end of said first cable, and wherein said first capstan drum rotates for multiple revolutions;

rotating a second capstan pulley in conjunction with said first capstan drum, said second capstan pulley rigidly coupled to said first capstan drum; and rotating a second capstan drum in conjunction with said second capstan pulley, wherein said second capstan drum is coupled to said second capstan pulley by a second cable, wherein said second capstan drum is coupled to said driven object.

35. A method as recited in claim 34 wherein said first capstan drum includes grooves for guiding said first cable on said first capstan drum and wherein said first capstan drum is cylindrical in shape.

36. A method as recited in claim 34 further comprising rotating a third capstan pulley and a second capstan drum in conjunction with said second capstan drum, wherein said third capstan pulley and said third capstan drum are coupled between said second capstan drum and said driven object.

37. A method as recited in claim 34 further comprising a spring member coupled between one end of said first cable and said first capstan dram to provide tension in said first cable and reduce slack in said first cable.

38. A method as recited in claim 35 wherein said second cable is coupled at both ends of said second cable to said second capstan drum.

39. A method as recited in claim 34 wherein said driven object is a user manipulatable object provided in a force feedback interface device coupled to a host computer.

40. A method for interfacing a graphical simulation implemented by a host computer with a user using an interface device including a mechanical transmission system, the method comprising:

providing a user manipulatable object graspable by a user and rotatable in a rotary degree of freedom;

sensing motion of said user manipulatable object and providing signals indicating of said motion to said host computer;

outputting a force from an actuator on said user manipulatable object in said rotary degree of freedom; and providing mechanical advantage for said force such that said force is increased in magnitude before being output on said user object, said mechanical advantage being provided from a capstan drive mechanism having a plurality of stages, each stage of said capstan drive mechanism including a pulley and a cylindrical drum, wherein said pulley is coupled to said cylindrical dram by a cable having two ends, each of said ends coupled to said cylindrical drum.

41. A method as recited in claim 40 wherein a cylindrical drum of a first stage of said capstan drive mechanism rotates for multiple revolutions.

42. A method as recited in claim 41 wherein said plurality of stages of said capstan drive mechanism are provided such that a first stage scales a force output by said actuator, and a second stage scales a force output by said first stage, wherein a force output by said second stage is output on said user manipulatable object.

43. A method as recited in claim 41 further comprising stopping said rotation of said user manipulatable object when said user manipulatable object is moved to a limit of a desired angular range.

44. A method as recited in claim 41 further comprising providing a spring tension in at least one of said cables using a spring member coupled to said at least one cable, said spring tension reducing slack in said cable.

45. A method as recited in claim 41 wherein one of said cables is wrapped a plurality of times around said first capstan pulley and a plurality of times around said first capstan drum.

46. A method as recited in claim 40 further comprising reducing a top rotational speed of said user manipulatable object to a maximum desired rotation speed.

47. A method as recited in claim 41 further comprising sending control signals to said host computer from an input device selected by said user and separate from said motion of said user manipulable object.

48. An interface device as recited in claim 28 wherein said speed reduction device includes a plurality of fan blades that provide air resistance to rotation of said user manipulatable object.

* * * * *